3,564,454

INSENSITIVE POLARIZED CAVITY
Filed Nov. 28, 1967

INVENTORS
William R. Hook
Roland H. Dishington
BY Ronald P. Hilberg

AGENT

United States Patent Office 3,564,454
Patented Feb. 16, 1971

3,564,454
LASER APPARATUS WITH LASER ROD BIREFRINGENCE INSENSITIVE POLARIZED CAVITY
William R. Hook, Los Angeles, Roland H. Dishington, Pacific Palisades, and Ronald P. Hilberg, Redondo Beach, Calif., assignors to TRW Inc., Redondo Beach, Calif.
Filed Nov. 28, 1967, Ser. No. 686,214
Int. Cl. H01s 3/16
U.S. Cl. 331—94.5                    10 Claims

ABSTRACT OF THE DISCLOSURE

Laser apparatus in which a plurality of mirrors are positioned to define a resonant laser cavity, the laser cavity having first, second, and third radiant energy paths arranged to intersect at a common point to form a generally Y-shaped configuration, the mirrors each being positioned at the end of one of the paths. A source of laser radiation is positioned in the cavity to radiate laser energy along the first path. A Rochon prism is provided within the cavity at the common point for directing radiation of one polarity radiating along the first path from the source of radiation into the second path and radiation of another polarity into the third path, the prism being capable of directing the radiant energy of one polarity returning along the second path into the first path and the radiant energy of the other polarity returning along the third path into the first path. A second Rochon prism is positioned in the second path, the second path Rochon prism being capable of passing radiant energy of one polarity returning along the second path and directing radiant energy of another polarity into a path leading out of the cavity. A third Rochon prism is positioned in the third path, the third path prism being capable of passing radiant energy of the other polarity returning along the third path and directing radiant energy into another path leading out of the cavity. A first Pockels cell is positioned in the second path for changing the polarity of radiation returning along the second path to direct the radiation into the one path leading out of the cavity. A second Pockels cell is positioned in the third path for changing the polarity of radiation returning along the third path to direct the radiation into the other path leading out of the cavity. In one variation of the laser the first and second Rochon prisms are eliminated and the remaining Rochon prism positioned in the cavity at the common point serves to direct radiation of one polarity radiating along the first path into the second path and radiation of another polarity into the third path, the prism being capable of directing radiant energy of one polarity returning along the second path into the first path and radiant energy of another polarity into one of the paths leading out of the cavity, the prism being capable of directing radiant energy of another polarity returning along the third path into the first path and radiant energy of another polarity into another path leading out of the cavity. In still another variation, the second and third Rochon prisms along with the Pockels cell of the third path are eliminated and a quarter-wave is provided in the first path. In this variation a single output is obtained along one of the paths leading out of the cavity.

BACKGROUND OF THE INVENTION (1) Field of the invention

This invention relates generally to laser apparatus, and more particularly to laster apparatus having a polarized laser cavity which is insensitive to natural or induced birefringence in the laser rod.

(2) Description of the prior art

Heretofore, many types of laser apparatus were required to operate in a way such that the laser radiation is polarized. One such apparatus is described in U.S. patent application, Ser. No. 625,549, filed Mar. 23, 1967, entitled "Lasers Incorporating Time Variable Reflectivity." In apparatus of this type there is usually provided a polarizing element and an electro-optical switch, such as a Pockels cell. The polarizing element in combination with the electro-optical element allows the characteristics of the laser cavity to be altered variously to achieve special effects, such as simple loss modulations, or cavity dumping, for example. During the actual lasing process the electro-optical element generally has no effect on the radiation, however the polarizing element compels the radiation during lasing to be polarized in a particular direction. Experimentation has shown that if a loss-less polarizing element is inserted into a laser cavity of the type described, the performance of the laser is seriously affected. This loss in performance is due to birefringence in the laser rod. At a low repetition laser rates this birefringence is the natural or residual birefringence which the rod has when it comes from the manufacturer, while at the higher laser repetition rates a phenomenon known as thermally induced birefringence takes place. It can be shown experimentally that a significant increase in rod birefringence occurs at a laser rate of 2 c.p.s. where performance falls off substantially.

Typical laser rod end output patterns obtained through experimentation reveal circularly arranged four dark areas, the center of each dark area representing a filament in the laser rod having certain properties. Vertically plane polarized light, for example, entering the rod along a filament suffers a ½ wave differential retardation of the fast ray component with respect to the slow ray component, resulting in a rotation of the polarity by 90°. Other filamentary portions of the rod experience less differential retardation resulting in output rays having polarities with various degress of ellipticity. The rest of the area of the rod end which exhibits no effect on the polarization of the input radiation occurs because the thermally induced fast and slow ray areas have cylindrical symmetry, and hence the input wave suffers no differential retardation by virtue of the fact that the input is polarized vertically.

SUMMARY OF THE INVENTION

Apparatus wherein radiation reflection means is provided defining a resonant laser cavity, the laser cavity having first, second, and third radiant energy paths arranged to intersect at a common point to form a generally Y-shaped configuration. Also provided are radiation polarizer means positioned in the cavity for directing radiation of one polarity radiating along the first path into the second path and radiation of another polarity into the third path, the radiation polarizer means being capable of directing the radiant energy of one polarity returning along the second path into the first path and radiant energy of another polarity into one path leading out of the cavity, the radiation polarizer means being capable of directing the radiant energy of the other polarity returning along the third path into the first path and radiant energy of another polarity into another path leading out of the cavity. Means are also provided in the cavity for changing the polarity of radiation returning along the second and third paths to direct a radiation along the second and third paths to direct a radiation into at least one of the paths leading out of the cavity.

One advantage of the present invention is that it provides laser apparatus which utilizes a polarized laser cavity which is insensitive to residual and induced laser rod birefringence from such causes as annealing or crystal stress birefringence and thermally induced birefringence. The use of the Y-shaped cavity provides for increased efficiency and higher repetition rates, particularly in the case of lasers employing glass laser rods. Another advantage is that the spatial coherence of the laser beam is improved and the life of the laser cavity components is lengthened by producing a more uniform power distribution across the wavefront. No matter what the polarization of a particular filament of a laser rod is, the energy leaving that filament is kept within the cavity and is returned to the laser rod to contribute to the lasing build-up. The arrangement thus eliminates cavity losses due to birefringence and yet is still a polarized cavity in that electro-optical switching elements can be utilized to achieve 0-switching or cavity dumping.

DESCRIPTION OF THE PREFERRED EMBODIMENT

Figure 1:
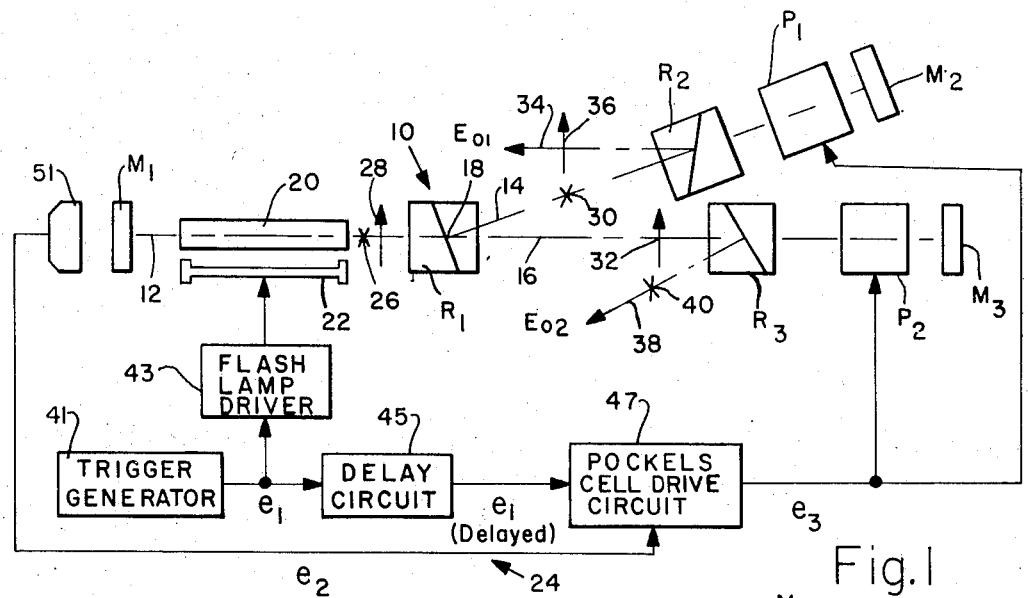
FIG. 1 is a showing of one embodiment of the present invention.

Referring now to FIG. 1 there is shown one embodiment 10 of the laser apparatus of the present invention. The apparatus 10 generally comprises a plurality of mirrors $M_1$, $M_2$, and $M_3$ defining a generally Y-shaped resonant cavity having first, second, and third radiation paths 12, 14, and 16, respectively, which intersect at a common point 18. A laser rod 20 is positioned in the path 12 and is provided with a pumping source 22. Positioned within the cavity at the intersection 18 is a first radiation polarizer $R_1$. A second polarizer $R_2$ and electro-optical member $P_1$ are positioned in the second path 14. A third polarizer $R_3$ and electro-optical member $P_2$ are in the third path 14. An electric circuit generally designated by the numeral 24 is provided for generating an actuating voltage $e_3$ for the electro-optical members $P_1$ and $P_2$.

The rod 20 can be a neodymium rod with its opposite ends directed toward the mirrors $M_1$ and $M_2$ and its longitudinal axis perpendicular to the mirrors. The flash lamp 22 is positioned adjacent the rod 20 and can be a Xenon flash tube.

The polarizers $R_1$, $R_2$, and $R_3$ can be Rochon prism polarizers which are positioned to send radiation in a particular direction, depending on the polarity of the radiation. Thus, radiation which approaches the polarizer $R_1$ from the left, or in other words from the rod 20 in path 12, is diverted into the path 14 when it is vertically polarized as indicated at 26. If radiation is horizontally polarized, as indicated at 28, it passes into the path 16. Radiation which approaches the polarizer $R_1$ from the right, or in other words from the direction of mirror $M_2$ along path 14, is diverted into the path 12 if such radiation is vertically polarized as indicated 30. Likewise radiation which approaches the polarizer $R_1$ from the right, but from the direction of the mirror $M_3$ along the path 16, is also directed into the path 12 if such radiation is horizontally polarized, as indicated at 32.

Similarly, radiation which approaches the polarizer $R_2$ from the left along the path 14 passes through the polarizer $R_2$ and toward the mirror $M_2$ if such radiation is vertically polarized, as indicated at 30. Radiation which approaches the polarizer $R_2$ from the right, or in other words from the direction of the mirror $M_2$ along the path 14, also passes through the polarizer $R_2$ into the path 12 if such radiation is vertically polarized, but is diverted in a direction 34 to provide an output $E_{01}$ if such radiation is horizontally polarized as indicated at 36.

Similarly, radiation which approaches the polarizer $R_3$ from the left along the path 16 passes through the polarizer $R_3$ if such radiation is horizontally polarized, as shown at 32. However, radiation which approaches the polarizer $R_3$ from the right, or in other words from the direction of the mirror $M_3$ along the path 16, also passes through the polarizer $R_3$ into the path 12 if such radiation is horizontally polarized, but is diverted in the output direction 38 to provide a radiation output $E_{02}$ if such radiation is vertically polarized, as shown at 40.

The electro-optical members $P_1$ and $P_2$ can be Pockels cells. The Pockels cell $P_1$ is positioned in path 14 in axial alignment with the polarizer $R_2$. The Pockels cell $P_2$ is positioned in the path 16 in axial alignment with the polarizer $R_1$ polarizer $R_3$, and the laser rod 20.

The electro-optical members $P_1$ and $P_2$ act as polarization rotators, when energized, and are effective to rotate the direction of polarization of the polarized radiation through predetermined angles depending upon the voltage applied. The Pockels cells $P_1$ and $P_2$ may be energized with either a positive voltage or a negative voltage, and the effect of the Pockels cells on polarized radiation is the same. When the Pockels cells are not energized they do not affect the polarization direction of the laser radiation. Thus, when there is no voltage on the Pockels cell $P_1$ laser radiation along the path 14 passes through the Pockels cell $P_1$, reflects from the mirror $M_2$ and then passes back through the cell $P_1$ in the opposite direction along path 14 without undergoing any polarity direction rotation. However, when the Pockels cell $P_1$ is energized, vertically polarized radiation, for example, in passing through the cell $P_1$ reflecting from the mirror $M_2$, and again passing through the cell $P_1$ in the opposite direction along path 14 undergoes a change in the direction of polarization from vertical to that of horizontal due to the polarity rotation action of the biased Pockels $P_1$. Similarly, when there is no voltage on the Pockels cell $P_2$ radiation along path 16 also passes through the Pockels cell $P_2$, reflects from mirror $M_3$ and then passes back through the cell $P_1$ in the opposite direction along path 16 without polarity direction rotation. But, when the Pockels cell $P_2$ is biased, horizontally polarized radiation, as indicated at 32, in passing through cell $P_2$, reflecting from the mirror $M_3$, and again passing through the cell $P_2$ in the opposite direction along path 16, experiences a change in the direction polarization from horizontal to vertical because of the polarity rotation action of the biased Pockels cell $P_2$.

The circuit 24 consists of a trigger generator 41 which provides in its output a signal $e_1$ for actuating a flash lamp driver 43 to pump the lamp 22 to excite the atoms in rod 20. A delay circuit 45, connected to the trigger generator 41 and to a Pockels cell drive circuit 47, serves to delay the signal $e_1$ a predetermined time and provides the drive circuit 47 with a delay signal $e_1$. A photodiode 51 positioned outside the laser serves to monitor the light output leaking through mirror $M_1$ and generates a cavity dump signal $e_2$ to the drive circuit 47. The drive circuit 47 is responsive to the delayed signal $e_1$ and the signal $e_2$ and is connected to the Pockels cells $P_1$ and $P_2$ so as to provide a bias signal $e_3$ in its output thereto. A detailed description of the drive circuit 47 is revealed in U.S. patent application of R. P. Hilberg, Ser. No. 686,267, filed Nov. 28, 1967 entitled "Self Synchronized Laser Apparatus and Method" and now abandoned. Briefly, the circuit 47 generates a voltage output $e_3$ which provides an initial positive D.C. voltage of predetermined magnitude on the Pockels cells $P_1$ and $P_2$. When the delayed trigger pulse signal $e_1$ from the delay circuit 45 is applied to the drive circuit 47 the D.C. voltage thus applied is caused to change rapidly from the predetermined magnitude to zero. The bias level remains at zero until the drive circuit 47 is actuated by a pulsed signal $e_2$ from the photodiode 51 at which time the voltage $e_3$ is caused to rapidly switch to a predetermined negative voltage. This negative voltage is maintained a predetermined time, and then the voltage $e_3$ slowly changes back to the initial positive D.C. voltage and remains there until another delayed trigger pulse $e_1$ is applied to the drive circuit 47.

Operation of the laser apparatus shown in FIG. 1 is as follows: Initially the bias voltage $e_3$ applied to the Pockels cells $P_1$ and $P_2$ is a positive D.C. voltage of a magnitude such that a high energy loss condition is established within the laser cavity. In this condition laser radiation emanating from the rod 20 is diverted out of the cavity by one of two paths, depending on its direction of polarization. If the laser radiatiton emanating from the rod 20 is vertically polarized as indicated at 26 it is diverted by polarizer $R_1$ along path 14, passes through the polarizer $R_2$ and the cell $P_1$, reflects from the mirror $M_2$ and again passes through the cell $P_1$ back along path 14 in the meantime experiencing a change of polarity direction from vertical to horizontal due to the polarity rotating action of the biased Pockels cell $P_1$. The now horizontally polarized radiation is then diverted by the polarizer $R_2$ in the output direction 34. Similarly, if the radiation emanating from the rod 20 is horizontally polarized, as indicated at 28, it passes through the polarizer $R_1$ into path 16, through the polarizer $R_3$ and the cell $P_2$, reflects from the mirror $M_3$ and again passes through the cell $P_2$ back along path 16 in the meantime also undergoes a change in polarity direction from horizontal to vertical due to the polarity rotating action of the cell $P_2$. The now vertically polarized radiation is then diverted by the polarizer $R_3$ in the direction 38.

The lasing sequence begins when the trigger generator 41 is actuated to provide the signal $e_1$ which causes the flash lamp driver 43 to energize the lamp 22 to start non-regenerative pumping or irradiating of the atoms in the rod 20. The number of excited atoms in the rod 20 reaches a maximum within a few hundred microseconds. The signal $e_1$ is delayed by the delay circuit 45 for a time equal to the time that it takes for the number of excited atoms to reach a maximum, and at that time the delayed signal $e_1$ is applied to the Pockels cell driver circuit 47, causing the bias level on the Pockels cells $P_1$ and $P_2$ to change rapidly to zero. With the bias removed from the Pockels cells $P_1$ and $P_2$ the laser cavity is placed in a low loss condition such that lasing begins to take place within the cavity, and the radiation energy starts to build up within a frequency range including the characteristic frequency of the lasing atoms in the rod 20. During this lasing build up interval vertically polarized laser radiation as indicated at 26 emanating from the rod 20 is diverted by polarizer $R_1$ along path 14, through the polarizer $R_2$ and cell $P_1$ toward mirror $M_2$ and is then reflected by mirror $M_2$ back along path 14, through the cell $P_1$ and polarizer $R_2$, through the laser rod 20 along path 12 toward mirror $M_1$ and is then reflected by mirror $M_1$ back along path 12 through the laser rod 20, thus completing one round trip cycle. Similarly, horizontally polarized laser radiation as indicated at 28 emanating from the rod 20 is passed by polarizer $R_1$ along path 16 through the polarizer $R_3$ and cell $P_2$ toward mirror $M_3$ and is then reflected by mirror $M_3$ back along path 16, through the cell $P_2$ and polarizer $R_3$, the polarizer $R_1$ and through the laser rod 20 along path 12 toward mirror $M_1$, and is then reflected by mirror $M_1$ back along path 12, through the laser rod 20, thus completing one round trip cycle. Therefore, no matter what the polarization direction of the laser radiation emanating from the rod 20 may be, a low loss path is provided which returns the radiation to the rod to contribute to the radiation buildup. Energy losses within the cavity which can be attributed to polarization effects are greatly reduced or eliminated. In particular, the laser rod 20 may be birefringent due to either manufacturing imperfections or due to thermally induced stress within the rod 20, and the operation of the cavity is substantially unaffected.

An interval of about 150 nanoseconds occurs before the radiation energy within the cavity reaches a significant level, after which the radiation level or in other words the energy stored within the cavity rapidly rises to its peak level. The rapidly rising radiation level creates a rapidly raising voltage pulse in the output signal $e_2$ of photodiode 51 by virtue of the leakage of laser power through mirror $M_1$. This voltage pulse $e_2$ is applied to the Pockels cell drive circuit 47, causing the bias level $e_3$ applied to the Pockels cells $P_1$ and $P_2$ to rapidly switch to a negative voltage. Upon the application of negative voltage on the Pockels cell $P_1$ the vertically polarized radiation in passing through the cell $P_1$ after reflection from the mirror $M_2$ experiences a change in polarization direction to horizontal. The polarizer $R_2$ diverts such horizontally polarized radiation in the direction 34 to provide the output $E_{01}$. Similarly horizontally polarized radiation in passing through the cell $P_2$ and again returning through the cell $P_2$ after reflection from the mirror $M_3$ also undergoes a change in polarization direction to that of vertical due to the polarity rotating action of the cell $P_2$ and is then diverted in the output direction 38 by the polarizer $R_3$ to provide the output $E_{02}$.

Figure 2:
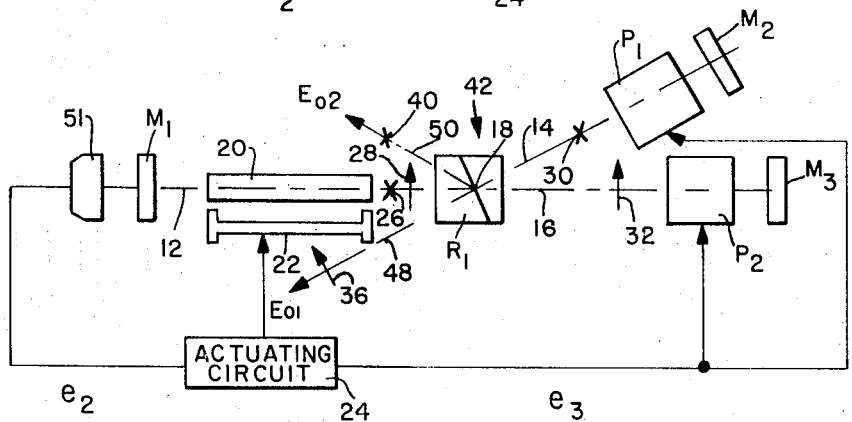
FIG. 2 is a showing of another embodiment of the present invention.

Referring now to FIG. 2 there is shown another embodiment of the present invention generally designated by the numeral 42. The embodiment of FIG. 2 is somewhat similar to the embodiment of FIG. 1 and like numerals designate like parts. In the embodiment of FIG. 2 the polarizers $R_2$ and $R_3$ have been eliminated and the polarizer $R_1$ now serves to provide new discharge paths 48 and 50 for the outputs $E_{01}$ and $E_{02}$, respectively. Radiation which approaches the polarizer $R_1$ from the rod in path 12 is diverted into the path 14 by the polarizer $R_1$ when it is vertically polarized and into the path 16 when it is horizontally polarized. Radiation which approaches the polarizer $R_1$ from the mirror $M_2$ along path 14 is diverted by the polarizer $R_1$ into the path 12 if such radiation is vertically polarized, and radiation approaching the polarizer $R_1$ from the mirror $M_3$ along the path 16 passes through the polarizer into the path 12 if the radiation is horizontally polarized. However, radiation which travels along path 14 from the mirror $M_2$ passes through the polarizer $R_1$ into the discharge path 48 if such radiation is horizontally polarized. Similarly if radiation travels along path 16 from the mirror $M_3$ and such radiation is vertically polarized, the polarizer $R_1$ diverts the radiation into the discharge path 50.

Operation of the laser apparatus shown in FIG. 2 is somewhat similar to the operation of the apparatus of FIG. 1. When the bias voltage $e_3$ is applied to the Pockels cells $P_1$ and $P_2$ such that a high energy loss condition is established within the cavity, laser radiation emanating from the rod 20 is diverted out of the cavity by one of the two paths 48 and 50, depending on the polarization of the radiation. As before, if the laser radiation emanating from the rod 20 is vertically polarized it is diverted by polarizer $R_1$ along path 14, passes through the cell $P_1$, reflects from the mirror $M_2$ and again passes through the cell $P_1$ back along path 14 in the meantime experiencing a change of polarity direction from vertical to horizontal due to the polarity rotating action of the biased Pockels cell $P_1$. This horizontally polarized radiation is then diverted by the polarizer $R_1$ in the direction 48. If the radiation emanating from the rod 20 is horizontally polarized, it passes through the polarizer $R_1$ into the path 16, through the cell $P_2$, reflects from the mirror $M_3$ and again passes through the cell $P_2$ back along path 16 also undergoing a change in polarity direction from horizontal to that of vertical due this time to the polarity rotating action of the cell $P_2$. This vertically polarized radiation is then diverted by the polarizer $R_1$ in the direction 50.

When the bias voltage is removed from the Pockels cells $P_1$ and $P_2$ the laser cavity is placed in a low loss condition such that lasing begins to take place within the cavity. During this lasing buildup period vertically polarized laser radiation emanating from the rod 20 is diverted by the polarizer $R_1$ along path 14, through the cell $P_1$ toward the mirror $M_2$ where it is reflected back along the path 14, through the cell $P_1$ and polarizer $R_1$ through the laser rod 20 along path 12 toward the mirror $M_1$ where it is reflected back along path 12 through the laser rod 20. Similarly, horizontally polarized laser radiation discharging from the rod 20 is passed by polarizer $R_1$ along path 16 through the cell $P_2$ toward the mirror $M_3$ where it is reflected back along path 16, through the cell $P_2$ and the polarizer $R_1$ through the rod 20 along path 12 to the mirror $M_1$ where it is reflected back along the path 12 and through the rod 20.

When the energy stored within the cavity rises to its peak level, the bias level $e_3$ applied to the Pockels cells $P_1$ and $P_2$ rapidly switches to a negative voltage. Upon the application of negative voltage of the Pockels cell $P_1$, the vertically polarized radiation in passing through the cell $P_1$ and again passing through the cell $P_1$ after reflection from the mirror $M_2$ experiences a change in the polarization direction to that of horizontal. The polarizer $R_1$ directs such horizontally polarized radiation in the direction 48 to provide the output $E_{01}$. Similarly, horizontally polarized radiation in passing through the cell $P_2$ and again returning through the cell $P_2$ after reflection from the mirror $M_3$ also undergoes a change in polarization direction to that of vertical due to the polarity rotating action of the cell $P_2$ and is then diverted in the output direction 50 by the polarizer $R_1$ to provide the output $E_{02}$.

Figure 3:
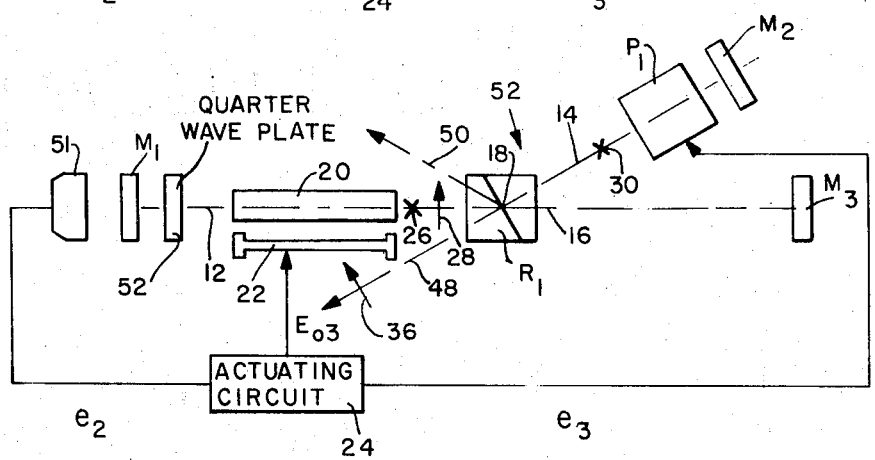
FIG. 3 is a showing of still another embodiment of the present invention.

Referring to FIG. 3 there is shown still another embodiment of the invention generally designated by the numeral 52. The embodiment of FIG. 3 is somewhat similar to the embodiment of FIG. 2 and like numerals designate like elements. In the embodiment of FIG. 3 the Pockels cell $P_2$ has been eliminated and a quarter wave plate 52 is provided in the path 12 between the mirror $M_1$ and the laser rod 20. A single energy output $E_{03}$ is obtained along the path 48. The path 50 in this embodiment serves merely as a discharge path for energy developed within the cavity during the high energy loss condition established within the cavity.

Operation of the laser apparatus shown in FIG. 3 is as follows: Initially, as before, the bias $e_3$ applied to the Pockels cell $P_1$ is in the form of a positive D.C. voltage of a magnitude such that a high energy loss condition laser radiation emanating from the rod 20 is diverted out of the cavity along the path 50. If the laser radiation emanating from the rod 20 is vertically polarized as indicated at 26 it is diverted by polarizer $R_1$ along path 14 through the cell $P_1$, reflects from the mirror $M_1$ back through $P_1$, and is then diverted by polarizer $R_1$ in the output direction 50 due to the polarity rotation action of the biased Pockels cell $P_1$. If the laser radiation emanating from the rod 20 is horizontally polarized as indicated at 28 it passes through the polarizer $R_1$, along the path 16 toward mirror $M_2$ and is then reflected back along path 16 through polarizer $R_1$, through the rod 20 along path 12, and through the ¼ wave plate 52 toward mirror $M_1$. As this horizontally polarized laser radiation passes through the quarter wave plate 52, and is reflected back from mirror $M_1$ along path 12 and passes once more through the quarter wave plate 52, its polarization direction is changed or effectively rotated to a vertical polarization direction due to the polarity rotation action of the quarter wave plate. The radiation then passes through the rod 20, is diverted by polarizer $R_1$ toward mirror $M_2$, and is then diverted into the output direction 48 due to the polarity rotation action of the biased Pockels cell $P_1$.

The lasing sequence begins when the bias level on the Pockels cell $P_1$ is caused to change rapidly to zero. With the bias that is removed from the cell $P_1$ the laser cavity assumes a low loss condition such that lasing begins to take place within the cavity. During this lasing buildup interval vertically polarized laser radiation as indicated at 26 is diverted by the polarizer $R_1$ along path 14 through the cell $P_1$, and is then reflected by mirror $M_2$ back along path 14 through the cell $P_1$ and the polarizer $R_1$, through the laser rod 20 along path 12, through the quarter wave plate 52, and is then reflected by mirror $M_1$ back along path 12 through the quarter wave plate 52 and back through the laser rod 20. Horizontally polarized laser radiation as indicated at 28 emanating from the rod 20 is passed by the polarizer $R_1$ along path 16 to the mirror $M_3$ where it is reflected back along path 16, through the polarizer $R_1$, the rod 20, the quarter wave plate 52, and is then reflected by the mirror $M_1$ back along path 12 again through the laser rod 20, thus completing a round trip cycle.

When the bias level $e_3$ applied to the Pockels cell $P_1$ is rapidly switched to a negative voltage, the vertically polarized radiation in passing through the cell $P_1$ and returning through the cell $P_1$ after reflection from the mirror $M_2$ experiences a change in polarization direction to that of horizontal. The polarizer $R_1$ diverts such horizontally polarized radiation in the direction 48 to provide the output $E_{01}$. On the other hand, horizontally polarized radiation, as indicated at 28, passes through the polarizer $R_1$ along the path 16 toward mirror $M_2$ and is then reflected back along path 16 through the polarizer $R_1$, through the rod 20 along path 12, and through the quarter wave plate 52 toward the mirror $M_1$. As the horizontally polarized laser radiation passes through the quarter wave plate 52, and is reflected back from mirror $M_1$ along path 12 and passes once more through the quarter wave plate 52, its polarization is changed to a vertical polarization due to the polarity rotation action of the quarter wave plate 52. This radiation then passes back through the rod 20, and is diverted by the polarizer $R_1$ through the Pockels cell $P_1$, toward the mirror $M_2$ where it reflects and is passed back through the Pockels cell $P_1$ and through the Pockels cell $P_1$ and emerges effectively rotated to a horizontal polarization due to the polarity rotation action of the Pockels cell $P_1$. The radiation is then diverted by the polarizer $R_1$ into the output direction 48.

It will be appreciated that for 0-switched mode operation the embodiments shown in FIGS. 1, 2, and 3 can be modified by eliminating the photodiode 51 and changing the reflectivity of mirror $M_1$ to a lower value, typically in the range of 4% to 75%. In this mode of operation the output would be taken through the mirror $M_1$. Another modification of the embodiment of FIG. 3 can be made to reduce the number of required components. In this modification the quarter wave plate 52 and the mirror $M_3$ can both be replaced with a roof prism having its knife edge oriented at 45° to the orthogonal axis of the polarizer $R_1$. The photodiode 51 then could be moved to a position behind either mirror $M_2$ or $M_3$.

We claim:
1. In combination:
radiation reflection means defining a resonant laser cavity, said laser cavity having first, second, and third radiant energy paths arranged to intersect at a common point to form a generally Y-shaped configuration;
a source of radiation positioned in said cavity to radiate laser radiation along said first path;
radiation polarizer means positioned in said cavity for directing radiation of one polarity radiating along said first path into said second path and radiation of another polarity into said third path, said radiation polarizer means being capable of directing said radiant energy of one polarity returning along said second path into said first path and radiant energy of another polarity into one path leading out of said cavity, said radiation polarizer means being capable of directing said radiant energy of the other polarity returning along said third path into said first path and radiant energy of another polarity into another path leading out of said cavity; and
means positioned in said cavity for permitting passage of radiation therethrough along said second and third paths when de-energized and for changing the polarity of radiation returning along said second and third paths to direct the radiation into at least one of said paths leading out of said cavity when energized.

2. The combination set forth in claim 1 wherein said radiation polarizer means comprises:
a Rochon prism positioned at said point.

3. The combination set forth in claim 2 further comprising:
radiation polarizer means positioned in each of said second and third paths, said second path radiation polarizer means being capable of passing radiant energy of said one polarity returning along said second path and directing radiant energy of another polarity into said one path leading out of said cavity, said third path radiation polarizer means being capable of passing radiant energy of said another polarity returning along said third path and directing radiant energy of another polarity into said other path leading out of said cavity.

4. The combination set forth in claim 3 wherein said radiation polarizer means positioned in said second and third paths each comprises:
a Rochon prism.

5. The combination set forth in claim 1 wherein said polarity changing means comprises:
a Pockels cell in said second path; and
a quarter wave plate in said first path.

6. The combination set forth in claim 1 wherein polarity changing means comprises:
first and second cell means positioned in said second and third paths, respectively, for changing the polarity of radiation returning along said second and third paths to direct the radiation into said paths leading out of said cavity.

7. The combination set forth in claim 6 wherein said first and second cell means each comprises:
a Pockels cell.

8. In combination:
a plurality of mirrors positioned to define a resonant laser cavity, said laser cavity having first, second, and third radiant energy paths arranged to intersect at a common point to form a generally Y-shaped configuration, said mirrors each being positioned at the end of one of said paths;
a source of radiation positioned in said cavity to radiate laser energy along said first path;
a Rochon prism positioned in said cavity at said point for directing radiation of one polarity radiating along said first path into said second path and radiation of another polarity into said third path, said prism being capable of directing said radiant energy of one polarity returning along said second path into said first path and radiant energy of another polarity into one path leading out of said cavity said prism being capable of directing said radiant energy of the other polarity returning along said third path into said first path and radiant energy of another polarity into another path leading out of said cavity;
a quarter wave plate in said first path; and
a Pockels cell in said second path for changing the polarity of radiation returning along said second path to direct the radiation into said one path leading out of said cavity.

9. In combination:
a plurality of mirrors positioned to define a resonant laser cavity, said laser cavity having first, second, and third radiant energy paths arranged to intersect at a common point to form a generally Y-shaped configuration, said mirrors each being positioned at the end of one of said paths;
a source of radiation positioned in said cavity to radiate laser energy along said first path;
a Rochon prism positioned in said cavity at said point for directing radiation of one polarity radiating along said first path into said second path and radiation of another polarity into said third path, said prism being capable of directing said radiant energy of one polarity returning along said second path into said first path and radiant energy of another polarity into one path leading out of said cavity, said prism being capable of directing said radiant energy of the other polarity returning along said third path into said first path and radiant energy of another polarity into another path leading out of said cavity;
a first Pockels cell in said second path for changing the polarity of radiation returning along said second path to direct the radiation into said one path leading out of said cavity; and
a second Pockels cell in said third path for changing the polarity of radiation returning along said third path to direct the radiation into said other path leading out of said cavity.

10. In combination:
a plurality of mirrors positioned to define a resonant laser cavity, said laser cavity having first, second, and third radiant energy paths arranged to intersect at a common point to form a generally Y-shaped configuration, said mirrors each being positioned at the end of one of said paths;
a source of radiation positioned in said cavity to radiate laser energy along said first path;
a Rochon prism positioned in said cavity at said point for directing radiation of one polarity radiating along said first path into said second path and radiation of another polarity into said third path, said prism being capable of directing said radiant energy of one polarity returning along said second path into said first path and said radiant energy of the other polarity returning along said third path into said first path;
a second Rochon prism positioned in said second path, said second path prism being capable of passing radiant energy of said one polarity returning along said second path and directing radiant energy of another polarity into a path leading out of said cavity;
a third Rochon prism positioned in said third path, said third path prism being capable of passing radiant energy of said other polarity returning along said third path and directing radiant energy of another polarity into another path leading out of said cavity;
a first Pockels cell positioned in said second path for changing the polarity of radiation returning along second path to direct the radiation into said one path leading out of said cavity; and
a second Pockels cell positioned in said third path for changing the polarity of radiation returning along said third path to direct the radiation into said other path leading out of said cavity.

References Cited

UNITED STATES PATENTS

| | | | |
|---|---|---|---|
| 2,745,316 | 5/1956 | Sziklai | 350—150 |
| 3,302,028 | 1/1967 | Sterzer | 350—150 |
| 3,346,319 | 10/1967 | Billings | 350—150 |
| 3,407,364 | 10/1968 | Turner | 331—94.5 |
| 3,416,097 | 12/1968 | Simpson | 331—94.5 |
| 3,432,767 | 3/1969 | Pole et al. | 331—94.5 |
| 3,435,371 | 3/1969 | White | 331—94.5 |
| 3,453,559 | 7/1969 | Sharp et al. | 331—94.5 |

RONALD L. WIBERT, Primary Examiner

E. S. BAUER, Assistant Examiner

U.S. Cl. X.R.

350—150